United States Patent [19]
Rayburn et al.

[11] Patent Number: 6,036,804
[45] Date of Patent: *Mar. 14, 2000

[54] MOLDABLE SELF-ADHERING FASTENER COVER AND INSTALLATION METHOD

[76] Inventors: Herbert Rayburn; Susan Rayburn, both of 2411 Catacombs Dr., New Caney, Tex. 77357

[ * ] Notice: This patent is subject to a terminal disclaimer.

[21] Appl. No.: 09/084,628

[22] Filed: May 26, 1998

Related U.S. Application Data

[63] Continuation-in-part of application No. 08/604,405, Feb. 21, 1996, Pat. No. 5,755,908.

[51] Int. Cl.[7] ............................. A47G 3/00; F16B 37/14
[52] U.S. Cl. ..................... 156/224; 156/475; 156/579; 411/377
[58] Field of Search .......................... 156/71, 212, 224, 156/475, 493, 579; 411/373, 377, 430, 431, 910

[56] References Cited

U.S. PATENT DOCUMENTS

| | | | |
|---|---|---|---|
| 152,737 | 7/1874 | Fletcher | 411/373 |
| 3,704,647 | 12/1972 | Painaud | 411/910 |
| 4,747,241 | 5/1988 | Whitman | 411/531 |
| 4,923,348 | 5/1990 | Carlozzo | 411/377 |
| 5,129,770 | 7/1992 | Coleman | 411/377 |
| 5,419,666 | 5/1995 | Best | 411/373 |
| 5,755,908 | 5/1998 | Rayburn | 156/224 |

*Primary Examiner*—Daniel Stemmer
*Attorney, Agent, or Firm*—Kenneth A. Roddy

[57] ABSTRACT

A pliable flat disk of laminated construction having a thin top layer of deformable material bonded to a relatively thicker intermediate layer of pliable adhesive sealant material and a removable bottom layer of release paper covering the exposed surface of the sealant material is deformed during installation to cover and seal the head of a fastener protruding from a surface. The disk is installed and deformed by a tool having an end with a recess slightly deeper than the height of the head of the fastener and an interior slightly larger than the outer periphery of the head of the fastener. The release paper is removed to expose the adhesive sealant material and the flat disk is generally centered and stuck, adhesive side down, onto the fastener head. The tool is then centered above the disk and fastener head and pressed downwardly with a twisting motion to deform the flat disk to encompass and conform substantially to the shape of the head of the fastener and cover a surface radially surrounding the fastener head such that the deformed disk is adhered to the fastener head and to the radially surrounding surface to provide an air-tight and liquid-tight seal between the fastener head and the radially surrounding surface and to prevent relative movement therebetween. It will also cover and seal a washer if one is used with the fastener.

20 Claims, 3 Drawing Sheets

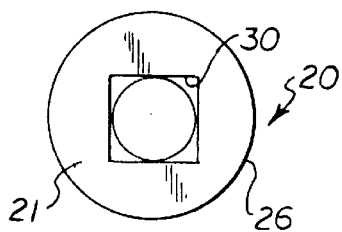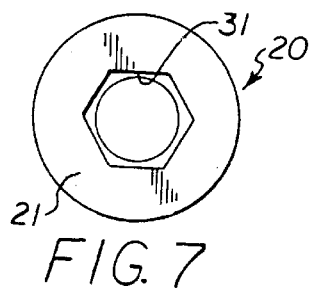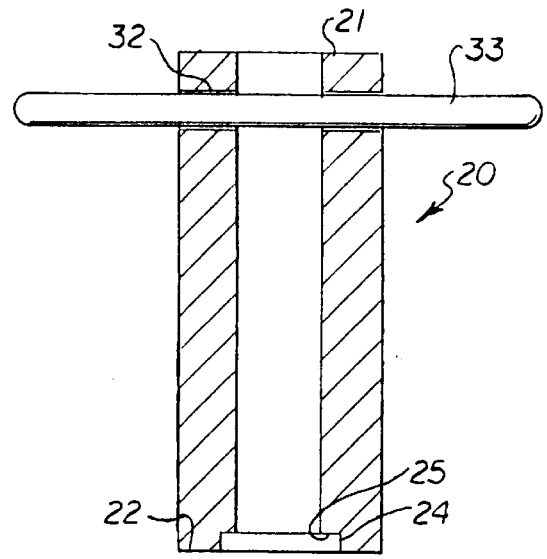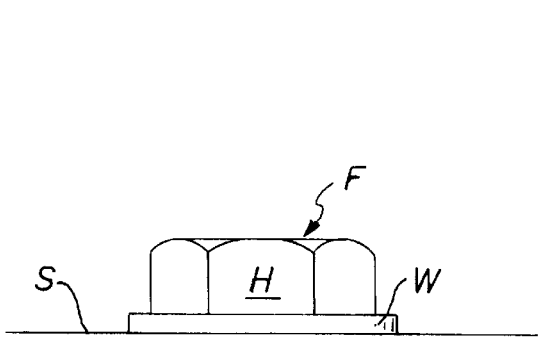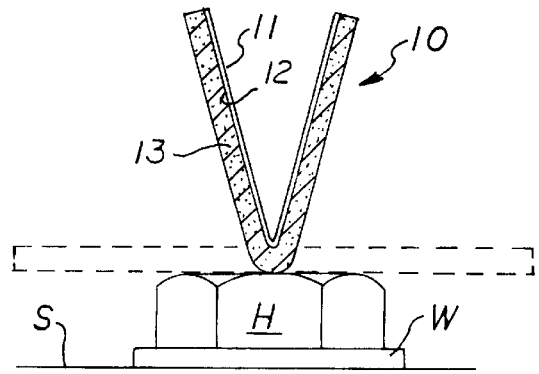

MOLDABLE SELF-ADHERING FASTENER COVER AND INSTALLATION METHOD

CROSS-REFERENCE TO RELATED APPLICATION

This application is a continuation-in-part of U.S. patent application Ser. No. 08/604,405 filed Feb. 21, 1996, now U.S. Pat. No. 5,755,908.

BACKGROUND OF THE INVENTION

1. Field of the Invention

This invention relates generally to protective caps and fastener covers, and more particularly to a fastener cover which is initially in the form of a moldable flat disk having an adhesive sealant on its bottom surface which is deformed over the head of a fastener with a tool that deforms the disk to completely encapsulate the head of the fastener and the radially surrounding surface to create an air-tight and liquid-tight seal and prevent loosening and relative movement therebetween.

2. Brief Description of the Prior Art

Headed fasteners such as bolts are commonly used in many outdoor installations where they are exposed to the harmful effects of the weather, such as fastening metal roofing and siding panels to the framework of building structures. If the head of the fastener is uncovered, thermal expansion and contraction due to exposure to temperature variations will often cause the fastener to become loose, and moisture can seep into the structure around the head of the loose fastener. Moisture can cause the fastener to rust or corrode and allows mildew to form around the fastener. Moisture also causes galvanic action between dissimilar metals which leads to corrosion.

The manual application of a caulking or sealing compound and the application of a poly-cloth around each individual fastener are common methods of sealing or protecting the heads of the fasteners. These methods are time consuming, unreliable, expensive, and unsightly. Also, prolonged exposure to extreme temperature variations, ultra-violet light, and moisture will often cause decay of the caulking or sealing compounds.

There are several patents which disclose various devices and methods for encasing the heads of fasteners.

Fletcher, U.S. Pat. No. 152,737 discloses a nut-lock which has a preformed hemispherical cup-shaped center with a radially extending circular flange indented with a series of radial cavities and a cut-away portion. The circular flange portion is compressed around the threaded portion of a bolt, above the nut to prevent the nut from being loosened.

Painaud, U.S. Pat. No. 3,704,647 discloses a preformed cap having a preformed cylindrical cavity at the center with a radially extending circular flange and a depending inwardly curved peripheral skirt at the bottom end. Upon striking the device, the inwardly curved skirt deforms inwardly underneath the head of the fastener in a space defined by a shoulder formed on the underside of the fastener head.

Gutshall, U.S. Pat. No. 3,885,492 discloses a preformed capped fastener formed of resilient flexible material which is mounted with a snap fit on the head of a fastener and has a yieldable central web on the top surface which gives way to permit a driver to be inserted into a drive recess on the head of the fastener.

Voller, U.S. Pat. No. 4,316,690 discloses a preformed capped bolt formed of rigid thermoplastic material which surrounds the head of the bolt and has an annular lip which cold flows to engage the threaded shank of the bolt when the nut is tightened on the bolt.

Johnston, Jr., U.S. Pat. No. 4,907,929 discloses a preformed dome-shaped bolt and nut cover formed of flexible resilient material which has an interior cavity with a lower portion which surrounds the nut and an upper portion which engages the threaded shank of the bolt extending out of the nut to prevent the cover from being removed.

Carlozzo et al, U.S. Pat. No. 4,923,348 discloses a preformed protective cap having a dome-shaped central portion surrounded by a flat annular flange. The cap is formed of a top layer of non-woven polyester fabric material, an underlying layer of a tacky unvulcanized butyl rubber compound, and a removable release liner of polyethylene film covering the bottom surface of the butyl rubber compound. The dome-shaped central portion is manually pressed about the bolt head.

Bell, U.S. Pat. No. 4,944,644 discloses a preformed screw fastener cap having a non-collapsible cylindrical upper portion which fits over the head of the fastener and a circumferential resilient clip or catch an the lower end which snap fits over a metal washer beneath the head of the fastener and compresses a rubber washer beneath the metal washer.

Henry, U.S. Pat. No. 4,826,380 discloses a pre-cast dome-shaped protective cover for cap screws having a dome-shaped outer shell filled with a curable sealant which is pressed over the exposed end of a fastener.

Coleman, U.S. Pat. No. 5,129,770 discloses a preformed dome-shaped protective cover for cap screws having a central cavity with an annular compression ring and annular gripping rings on the interior of the cavity which engage the head of the fastener. The cover is pressed onto the head of the fastener with a tool having a concave recess which mates with the hemispherical exterior of the cover.

Simpson et al, U.S. Pat. Nos. 4,936,938, 5,096,759, and U.S. Pat. No. 5,142,837 discloses laminated sheets of roofing material and process for manufacturing the sheets in rolls. The laminated sheets have a top layer of aluminum foil adhesively bonded to a polyethylene layer, an underlying layer asphalt, and a release paper covering the bottom surface of the asphalt. The roofing material sheets are applied over a roofing surface as a series of elongate overlapping parallel strips.

Best, U.S. Pat. No. 5,419,666 discloses a two-piece protective waterproof cover assembly which includes a rigid dome-shaped cover which overlies the head of the fastener and provides a cavity around the head to permit loosening of the fastener and movement of the head away from the surface on which is is initially installed. A circular flexible pad having an adhesive on its bottom surface overlies the dome-shaped cover and adheres it to the support structure.

The present invention is distinguished over the prior art in general, and these patents in particular by a pliable flat disk of laminated construction having a thin top layer of deformable material bonded to a relatively thicker intermediate layer of pliable adhesive sealant material and a removable bottom layer of release paper covering the exposed surface of the sealant material. The flat disk is deformed during installation to cover and seal the head of a fastener protruding from a surface. The disk is installed and deformed by a tool having an end with a recess slightly deeper than the height of the head of the fastener and an interior slightly larger than the outer periphery of the head of the fastener. The release paper is removed to expose the adhesive sealant material and the flat disk is generally centered and placed, adhesive side down, onto the fastener head. The tool is then centered above the disk and fastener head and pressed downwardly with a twisting motion to deform the flat disk to encompass and conform substantially to the shape of the head of the fastener and cover a surface radially surrounding the fastener head such that the deformed disk is adhered to the fastener head and to the radially surrounding surface to provide an air-tight and liquid-tight seal between the fastener head and the radially surrounding surface and to prevent relative movement therebetween. It will also cover and seal a washer if one is used with the fastener.

SUMMARY OF THE INVENTION

It is therefore an object of the present invention to provide a moldable self-adhering cover for the head of a fastener and method of installation.

It is another object of this invention to provide a moldable self-adhering cover for fastener heads which will deform during installation to encapsulate and seal fastener heads and washers of various sizes to the radially surrounding surfaces.

Another object of this invention is to provide a moldable self-adhering cover for fastener heads that is initially a flat disk which is deformed during installation to encapsulate and seal fastener heads and washers to radially surrounding surfaces.

Another object of this invention is to provide a moldable self-adhering cover for fastener heads in the form of a pliable flat disk of laminated construction which is deformed during installation to encapsulate and seal fastener heads and washers to radially surrounding surfaces.

Another object of this invention is to provide a moldable self-adhering cover for fastener heads which will effect an air-tight and liquid-tight seal between the fastener head and radially surrounding surface and prevent relative movement therebetween.

Another object of this invention is to provide a moldable self-adhering cover for fastener heads which has a deformable outer layer which will reflect heat and light.

Another object of this invention is to provide a tool for installing fastener covers which has at least one end adapted to receive and deform a moldable flat disk onto fastener heads and washers.

Another object of this invention is to provide a method for quickly and inexpensively covering and sealing the head of a fastener protruding from a surface.

A further object of this invention is to provide a system of apparatus for covering and sealing fastener heads which occupies a small amount of space and is easily transported.

A still further object of this invention is to provide a moldable self-adhering cover for fastener heads which is simple in construction and economical to manufacture.

Other objects of the invention will become apparent from time to time throughout the specification and claims as hereinafter related.

The above noted objects and other objects of the invention are accomplished by a pliable flat disk of laminated construction having a thin top layer of deformable material bonded to a relatively thicker intermediate layer of pliable adhesive sealant material and a removable bottom layer of release paper covering the exposed surface of the sealant material. The flat disk is deformed during installation to cover and seal the head of a fastener protruding from a surface. The disk is installed and deformed by a tool having an end with a recess slightly deeper than the height of the head of the fastener and an interior slightly larger than the outer periphery of the head of the fastener. The release paper is removed to expose the adhesive sealant material and the flat disk is generally centered and placed, adhesive side down, onto the fastener head. The tool is then centered above the disk and fastener head and pressed downwardly with a twisting motion to deform the flat disk to encompass and conform substantially to the shape of the head of the fastener and cover a surface radially surrounding the fastener head such that the deformed disk is adhered to the fastener head and to the radially surrounding surface to provide an air-tight and liquid-tight seal between the fastener head and the radially surrounding surface and to prevent relative movement therebetween. It will also cover and seal a washer if one is used with the fastener.

BRIEF DESCRIPTION OF THE DRAWINGS

FIG. 6 is a top plan view of one end of the deforming tool showing a square recess for receiving a driving tool.

FIG. 7 is a top plan view of one end of the instalation tool showing a hexagonal recess for receiving a driving tool.

FIG. 8 is a longitudinal cross section view showing a transverse bore through one end of the deforming tool through which a rod is installed to serve as a handle for the tool.

FIG. 9 is an enlarged side elevation of a typical fastener head and washer installed on a surface secured by the fastener.

FIG. 10 is a cross section through the disk showing it bent into a V-shaped configuration and placed on the fastener head, and showing the disk in a generally flat condition in dashed line.

DESCRIPTION OF THE PREFERRED EMBODIMENT

Figure 1:
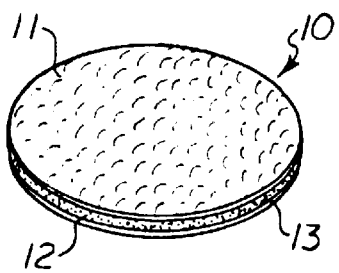
FIG. 1 is an isometric view showing the top of the moldable self-adhering fastener cover in its initial flat disk configuration in accordance with the present invention.
Figure 2:
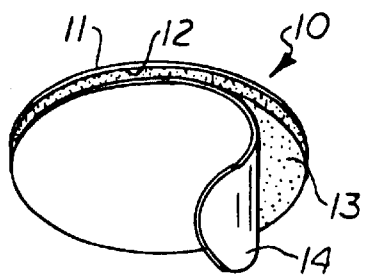
FIG. 2 is an isometric view showing the bottom of the moldable self-adhering fastener cover with a portion of the release paper peeled back to expose the adhesive sealant layer.
Figure 3:
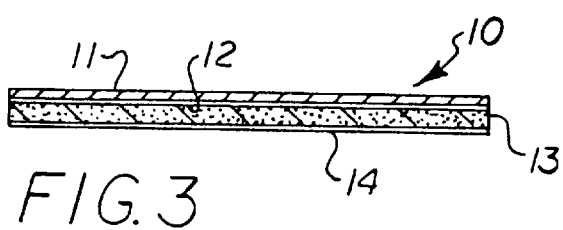
FIG. 3 is an enlarged cross section through the moldable self-adhering fastener cover showing the laminated construction.

Referring to the drawings by numerals of reference, there is shown in FIGS. 1, 2, and 3, a preferred moldable self-adhering fastener cover 10. Prior to installation, the fastener cover 10 is in the form of a thin flat disk. The fastener cover 10 is of laminated or sandwich construction.

As best seen in FIG. 3, the fastener cover 10 has a top layer deformable material. The deformable material may be any suitable material such as aluminum, cloth, rubber, etc. In a preferred metallic embodiment the top layer is formed of thin flexible aluminum foil 11 having a preferred thickness of approximately 0.0005 inches (0.5 mils). Preferably, the aluminum foil has a dimpled surface texture. The aluminum foil layer 11 is adhesively bonded to the top surface of a polyethylene film layer 12 having a preferred thickness of approximately 0.004 inches by a suitable adhesive (not shown). A layer of a suitable adhesive such a bitumen asphalt adhesive 13, butyl rubber adhesive, or other suitable adhesive material is bonded to the bottom surface of the polyethylene film layer 12, and a release paper 14 is applied over the bottom surface of the adhesive layer 13. In a preferred cloth-top embodiment the deformable material is a polycloth material such as a polycloth material manufactured by Dupont Company under the tradename SONTARA.

A preferred polyethylene film material is a cross-link high-density film, such as a polyethylene film sold by Van Leer Plastics under the trademark VALERON 4020. A preferred adhesive for bonding the polyethylene film is a resin adhesive, such as a resin adhesive sold by Dupont Company under the trademark SURLYN. A preferred release paper is a commercially available densified bleached Kraft paper coated with a silicone compound sold by Mead Release Products or James River Corporation. It should be understood, that other equivalent polyethylene film, adhesive bonding materials, and release paper may be used without departing from the scope of the invention.

The preferred bitumen material is a straight-run asphalt having a softening point in the range of from about 100° F. to about 120° F., and a penetration of about 90–140 dmm, and may include additives such as styrene-butadiene radial block polymers, aromatic processing oil, hydrocarbon tackifying resin, an antioxidant to minimize cross-linking of the molecules of asphalt, and silica sand as a filler.

A preferred bitumen asphalt mixture incorporates the following ingredients in the corresponding proportions: about 63 parts bitumen; about 12 parts styrene-butadiene radial block polymers; about 12 parts 325 mesh grade ground silica sand as a filler; about 7 parts aromatic processing oil; about 5 parts hydrocarbon tackifying resin; and about 0.4 parts antioxidant.

Suitable commercially available styrene-butadiene radial block co-polymers (thermal plastic elastomers) are sold under the trademark SOLPRENE by Phillips Petroleum and under the trademark FINAPRENE by Fina Oil and Chemical Company. A suitable commercially available aromatic processing oil is sold under the trademark SUNDEX by Sun Oil Company. A suitable commercially available hydrocarbon tackifying resin is sold under the trademark ESCOREZ by Exxon Chemical Company. A suitable commercially available antioxidant is sold under the trademark STALITE by Vanderbuilt Company.

A preferred method for producing the flat disk-shaped fastener covers 10 is to form an elongated sheet of material having the layers as described above by conventional lamination manufacturing methods, and then die-punching the flat disk configurations from the sheet of material. The disks may also be provided in the form of a "peel-and-stick" construction wherein the disk shapes are die cut into a laminated sheet of material such that the disks can be peeled off of the release paper to expose the adhesive sealant bottom surface.

Figure 4:
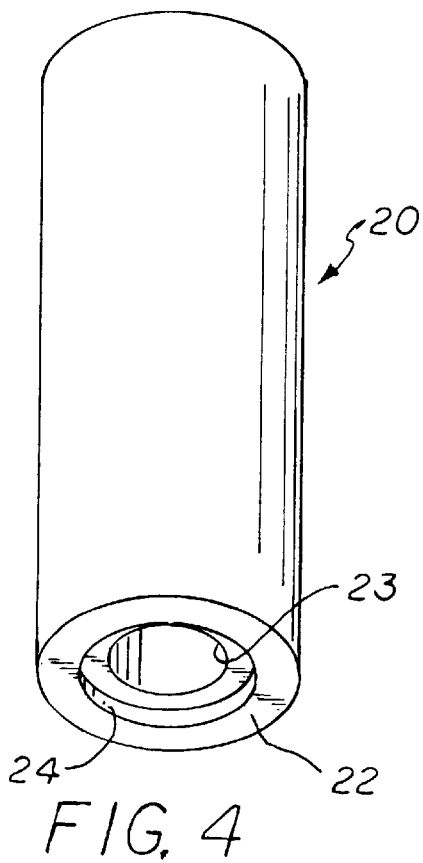
FIG. 4 is an isometric view of the deforming tool used to install the moldable self-adhering fastener cover.
Figure 5:
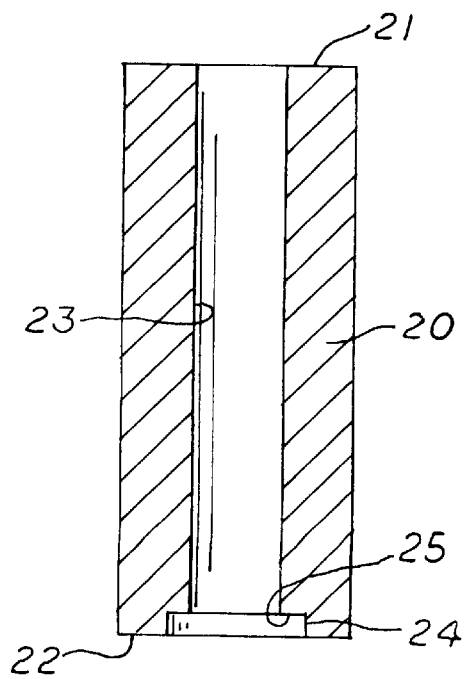
FIG. 5 is a longitudinal cross section through the deforming tool.

Referring now to FIGS. 4 and 5, the deforming tool 20 used to install the fastener covers 10 is shown. The tool 20 is a generally cylindrical member formed of rigid material such as wood or plastic having flat surfaces 21 and 22 at opposite ends. The exterior diameter of each flat end surface 21 and 22 is approximately the same diameter as the diameter of the flat disk 10. A central longitudinal bore 23 extends through the center of the tool 20. The central bore 23 is of a diameter slightly larger than the outer periphery of the head of the fastener to be covered. One flat end 22 of the tool 20 has a stepped counterbore 24 of a diameter slightly larger than the outer diameter of a washer which may be used with the fastener to be covered. The counterbore 24 defines a radial shoulder 25 between the interior diameter of the central bore 23 and the outer diameter of the counterbore 24. As explained hereinafter the counterbored end 22 of the tool 20 is used to cover fasteners having a washer installed between the head of the fastener to be covered and the surface of the material being secured by the fastener.

Although the deforming tool 20 is illustrated by way of example as having a single counterbore, it should be understood that a plurality of stepped counterbores may also be provided so that a single tool may be used for installing disks on a range of different fastener and washer sizes. It should also be understood that both ends of the tool 20 may be provided with recesses of different sizes for receiving various sizes of fastener heads and washers. Alternatively, the upper end of the tool 20 may be configured to receive various drivers for rotating the tool. The exterior side wall of the tool 20 may also be provided with a tubular sleeve formed of resilient material, such as rubber, to provide a comfortable and secure hand gripping surface for gripping and manipulating the tool as described below.

Referring now to FIGS. 6, 7, and 8 there are shown several modifications of the deforming tool 20 which are configured to receive a driving tool for applying the downward and rotational movement. FIG. 6 shows a square recess 30 which extends downwardly a short distance from the end 21 to receive the driver member of a socket wrench. FIG. 7 shows a hexagonal recess 31 which extends downwardly a short distance from the end 21 to receive a mating hexagonal male member of a suitable driver. FIG. 8 shows transverse bore 32 near the end 21 of the tool 20 through which a rod 33 may be installed to serve as a handle for the tool and the resilient sleeve 26 only extends beyond the lower flat end 22 of the tool.

INSTALLATION

Referring now to FIGS. 9 through 13, the method of installing and deforming the disk-shaped moldable self-adhering fastener covers 10 will be described. In the following description the example of a fastener F to be covered is a metal roofing bolt having a hexagonal head H and a washer W installed between the head of the fastener and the surface S of the material being secured by the fastener. This type of fastener is commonly used to secure metal roofs and metal siding panels to underlying support members, and the deforming tool 20 is shown oriented with the counterbored end 22 of the tool down to cover the fastener head H and the washer W.

Also in the following example the deforming tool 20 is shown with the counterbored end 22 down for installing the disks 10 on fasteners having a washer beneath the bolt head. However, it should be understood, that the tool may be inverted and used with the non-counterbored end 21 down for installing the disks on fasteners which do not have a washer beneath the bolt head.

The exposed surfaces of the fastener head H and washer and the surface S around the fastener F (FIG. 9) are thoroughly cleaned to remove foreign materials such as oil, dirt, grease, caulking, loose rust or paint, mildew, and leave a clean surface with only tightly adhered paint and perhaps some tightly adhered rust. Worn fasteners should be replaced and all fasteners should be tightened before applying the fastener cover.

The protective release paper 14 is peeled off the bottom of the disk 10 to expose the tacky adhesive surface 13 (FIG. 2) or if provided in sheets, the disk is peeled off the sheet, and the center of the disk is stuck, adhesive side down, onto the fastener head H. FIG. 10 shows a method for quickly and easily centering and applying the disk to the fastener head. In this method, the outer diameter of the disk is gripped by the tumb and fingers of the installer and squeezed to bend it along its midsection into a generally V-shaped configuration (i.e., loosely folded in half). The apex of V-shape or midsection of the disk, is centered and pressed, adhesive side down, to stick the disk onto the top of the fastener head H. Depending upon the materials of construction, the disk, when released, may resume its original flat condition, indicated in dashed line. Otherwise, the installer may press down on the outer sides of the disk to generally flatten it out to a generally flat horizontal configuration.

After the disk 10 has been stuck onto the fastener head, the tool 20 is gripped in the hand of the installer and centered above the disk affixed to the head H of the fastener F with the longitudinal tool axis aligned with the longitudinal axis of the fastener and then the tool is pushed downwardly and twisted about its longitudinal axis.

Figure 11:
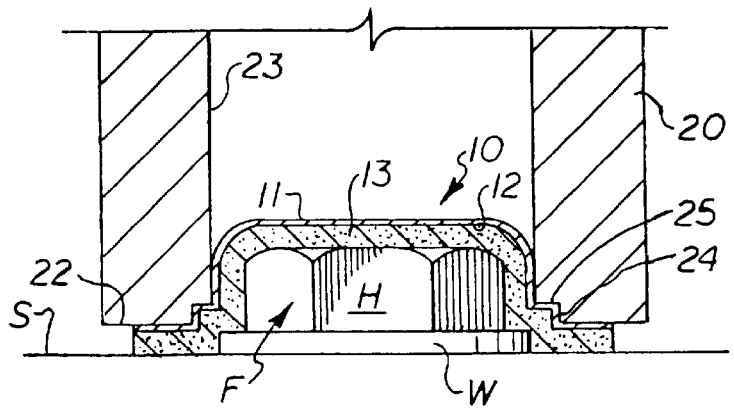
FIG. 11 is a longitudinal cross section through the lower portion of the deforming tool showing the moldable self-adhering fastener cover deformed to encapsulate and seal the head of the fastener and washer.
Figure 12:
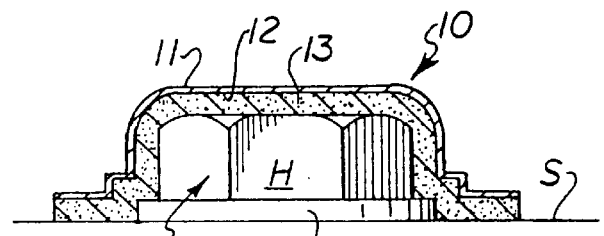
FIG. 12 is a cross section through the disk with the deforming tool removed showing the moldable self-adhering fastener cover conformed substantially to the shape of the head of the fastener and adhered to the fastener head and washer, and to the surface radially surrounding the washer.

As shown in FIGS. 11 and 12, the disk 10 deforms under the downward and twisting force to encapsulate the head H of the fastener and adhere to the fastener head to the surfaces radially surrounding the fastener head. As shown in the examples of fasteners having a washer (FIGS. 9 through 13), as the disk 10 deforms, the smaller central bore 23 of the tool 20 deforms the disk to conform to and seal the fastener head H to the washer W, and the counterbore 24 and shoulder 25 deforms the disk to seal the washer W to the surface S being fastened, and the flat end surface 22 of the tool seals the peripheral surface of the disk to the surface S radially surrounding the washer.

Figure 13:
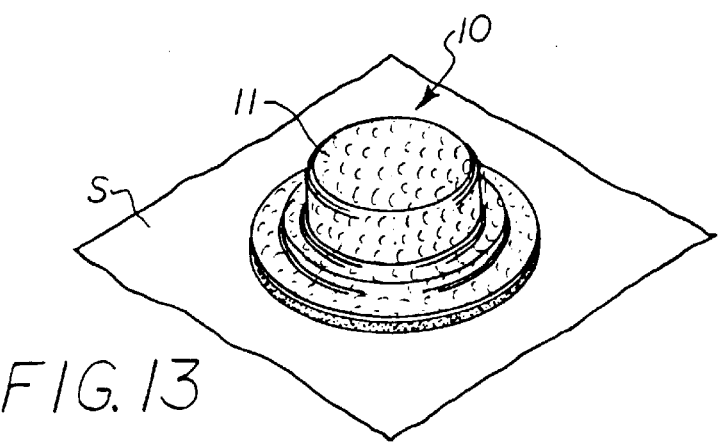
FIG. 13 is an isometric view showing the fastener cover conformed substantially to the shape of the head of the fastener and adhered to the fastener head and washer, and to the surface radially surrounding the washer.

Thus, after deformation, the fastener cover 10 provides an air-tight and liquid-tight seal between the fastener head and the radially surrounding surface to prevent leaks, rust, and also prevents fastener movement so that it will not back out or become loosened (FIG. 13).

After the fastener cover has been installed, the aluminum top layer 11 provides a reflective surface which reflects heat and light and protects the fastener and the asphalt adhesive layer 13 of the cover from the detrimental effects of infrared and ultraviolet light rays which would otherwise tend to polymerize the hydrocarbon molecules in the bitumen asphalt.

The polyethelene film layer 12 bonded between the aluminum foil layer 11 and the asphalt adhesive sealant layer 13 provides additional structural integrity to the bitumen asphalt sealant material. To further seal the fastener, an epoxy paint or roof coating may be applied over the fastener cover after is has been installed on the fastener.

While this invention has been described fully and completely with special emphasis upon a preferred embodiment, it should be understood that within the scope of the appended claims the invention may be practiced otherwise than as specifically described herein.

We claim:

1. In combination, a pliable flat disk and and a deforming tool for deforming the disk to cover and seal the head of a fastener protruding from a surface:

said pliable flat disk being of laminated construction having a thin top layer of deformable material bonded to a relatively thicker layer of pliable adhesive sealant material;

said deforming tool having an end with a recess slightly deeper than the height of the head of the fastener and said recess having an interior slightly larger than the outer periphery of the head of the fastener;

said flat disk being deformed onto the head of the fastener by exposing said adhesive sealant material, generally centering it over the top of said fastener head with said adhesive sealant material facing down, and then sticking it onto the top of said fastener head; and placing said tool recess onto said disk and pressing said tool downwardly to deform said flat disk to encompass and conform substantially to the shape of the head of the fastener and cover a surface radially surrounding the fastener head such that said deformed disk is adhered to said fastener head and to the radially surrounding surface to provide an air-tight and liquid-tight seal between said fastener head and the radially surrounding surface and to prevent relative movement therebetween.

2. The combination according to claim 1 wherein said flat disk is deformed onto the head of the fastener by pressing said tool downward and twisting said tool to deform said flat disk to encompass and conform substantially to the shape of the head of the fastener and cover a surface radially surrounding the fastener head such that said deformed disk is adhered to the fastener head and to the radially surrounding surface to provide an air-tight and liquid-tight seal between the fastener head and the radially surrounding surface and to prevent relative movement therebetween.

3. The combination according to claim 1 wherein said fastener has a washer disposed between said surface and the head of the fastener;

said deforming tool recess has a counterbore slightly deeper than the height of the washer and an interior slightly larger than the outer periphery of the washer; and said flat disk is deformed onto the head of the fastener and washer by pressing said tool downward to deform said flat disk to encompass and conform substantially to the shape of the head of the fastener and the washer and cover a surface radially surrounding the washer such that said deformed disk is adhered to the fastener head and the washer and the radially surrounding surface to provide an air-tight and liquid-tight seal between the fastener head, the washer, and the radially surrounding surface and to prevent relative movement therebetween.

4. The combination according to claim 3 wherein said flat disk is deformed onto the head of the fastener and washer by pressing said tool downward and twisting said tool to deform said flat disk to encompass and conform substantially to the shape of the head of the fastener and the washer and cover a surface radially surrounding the washer such that said deformed disk is adhered to the fastener head and the washer and the radially surrounding surface to provide an airtight and liquid-tight seal between the fastener head, the washer, and the radially surrounding surface and to prevent relative movement therebetween.

5. The combination according to claim 1 wherein said deforming tool is a generally cylindrical member of rigid material having a flat end and a circular recess in said flat end, said circular recess being slightly deeper than the height of the head of the fastener and having an interior diameter slightly larger than the outer periphery of the head of the fastener.

6. The combination according to claim 1 wherein said deforming tool is a generally cylindrical member of rigid material having a flat end with a circular recess and a circular counterbore in said flat end, said circular recess being slightly deeper than the height of the head of the fastener and having an interior diameter slightly larger than the outer periphery of the head of the fastener; and said circular counterbore being slightly deeper than the height of a washer beneath the head of the fastener and having an interior diameter slightly larger than the outer periphery of the washer.

7. The combination according to claim 1 wherein said flat disk has a polyethylene film layer bonded between said top layer of deformable material and said layer of pliable adhesive sealant material.

8. The combination according to claim 1 wherein said top layer of deformable material material is a light-reflective and heat reflective material.

9. The combination according to claim 1 wherein said top layer of deformable material is a synthetic cloth material.

10. The combination according to claim 1 wherein said top layer of deformable material is a metallic material.

11. The combination according to claim 10 wherein said metallic material is aluminum.

12. The combination according to claim 1 wherein said flat disk has a thin top layer of aluminum material, a polyethylene film layer bonded to said top layer of aluminum material, and an intermediate layer of pliable adhesive sealant material bonded to said polyethylene film layer.

13. A method for covering and sealing the head of a fastener protruding from a surface comprising the steps of;

providing a pliable flat disk of laminated construction having a thin top layer of deformable material bonded to a relatively thicker layer of pliable adhesive sealant material;

providing a deforming tool having a recess slightly deeper than the height of the head of the fastener and having an interior slightly larger than the outer periphery of the head of the fastener;

generally centering said disk over the top of said fastener head with said adhesive sealant material facing down, and then sticking it onto the top of said fastener head;

placing said tool recess onto said disk and pressing said tool downwardly to deform said flat disk to encompass and conform substantially to the shape of the head of the fastener and cover a surface radially surrounding the fastener head such that said deformed disk is adhered to said fastener head and to the radially surrounding surface to provide an air-tight and liquid-tight seal between the fastener head and the radially surrounding surface and to prevent relative movement therebetween.

14. The method according to claim 13, wherein said pliable flat disk has a removable bottom layer of release paper covering the exposed surface of said sealant material; and said release paper is removed to expose said adhesive sealant material prior to said step of generally centering said disk over the top of said fastener head.

15. The method according to claim 13, wherein a plurality of pliable flat disks are provided in a sheet; and a said disk is peeled off of said sheet to expose said adhesive sealant material prior to said step of generally centering said disk over the top of said fastener head.

16. The method according to claim 13 wherein said step of generally centering said disk over the top of said fastener head includes manually bending said flat disk in half along its midsection to form a generally V-shaped configuration, generally centering the apex of V-shape, adhesive side down, above said fastener head and pressing down, to stick said disk onto the top of said fastener head.

17. The method according to claim 16 including the further step of after sticking said disk onto the top of said fastener head, manually flattening said V-shaped configuration to a generally flat horizontal configuration.

18. The method according to claim 13 wherein said step of pressing said tool downward includes twisting said tool to deform said flat disk to encompass and conform substantially to the shape of the head of the fastener and cover a surface radially surrounding the fastener head such that said deformed disk is adhered to the fastener head and to the radially surrounding surface to provide an air-tight and liquid-tight seal between the fastener head and the radially surrounding surface and to prevent relative movement therebetween.

19. The method according to claim 13 wherein said fastener has a washer disposed between said surface and the head of the fastener, said installation tool recess has a counterbore slightly deeper than the height of the washer and an interior slightly larger than the outer periphery of the washer; and said step of pressing said tool downwardly includes deforming said flat disk to encompass and conform generally to the shape of the head of the fastener and the washer and cover a surface radially surrounding the washer such that said disk is adhered to the fastener head and the washer and the radially surrounding surface to provide an air-tight and liquid-tight seal between the fastener head, the washer, and the radially surrounding surface and to prevent relative movement therebetween.

20. The method according to claim 19 wherein said step of pressing said tool downward includes twisting said tool to deform said flat disk to encompass and conform substantially to the shape of the head of the fastener and the washer and cover a surface radially surrounding the washer such that said disk is adhered to the fastener head and the washer and the radially surrounding surface to provide an air-tight and liquid-tight seal between the fastener head, the washer, and the radially surrounding surface and to prevent relative movement therebetween.

* * * * *